(12) United States Patent
Easley

(10) Patent No.: US 10,346,835 B1
(45) Date of Patent: Jul. 9, 2019

(54) SYSTEMS AND METHODS FOR PRESENTING RECOGNIZABLE BANK ACCOUNT TRANSACTION DESCRIPTIONS COMPILED THROUGH CUSTOMER COLLABORATION

(71) Applicant: United Services Automobile Association (USAA), San Antonio, TX (US)

(72) Inventor: Jeffrey Walton Easley, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 317 days.

(21) Appl. No.: 14/642,895

(22) Filed: Mar. 10, 2015

Related U.S. Application Data

(63) Continuation of application No. 12/246,619, filed on Oct. 7, 2008, now abandoned.

(51) Int. Cl.
G06F 16/683 (2019.01)
G06Q 20/38 (2012.01)
G06Q 40/02 (2012.01)

(52) U.S. Cl.
CPC ............ *G06Q 20/38* (2013.01); *G06Q 40/02* (2013.01)

(58) Field of Classification Search
CPC ......... G06F 17/30011; G06F 17/30867; G06F 17/30864; G06F 17/30873; G06Q 30/02; G06Q 40/02; G06Q 30/0255

USPC ............ 705/14, 17–21, 30, 68, 70, 317, 323
See application file for complete search history.

(56) References Cited

U.S. PATENT DOCUMENTS

| | | | |
|---|---|---|---|
| 5,878,416 A | 3/1999 | Harris et al. | |
| 6,012,056 A | 1/2000 | Melove | |
| 6,029,145 A | 2/2000 | Barritz et al. | |
| 6,141,404 A | 10/2000 | Westerlage et al. | |
| 6,230,302 B1 | 5/2001 | Gabele et al. | |
| 6,385,645 B1 | 5/2002 | De Jong | |
| 6,446,141 B1 | 9/2002 | Nolan et al. | |
| 6,665,655 B1 * | 12/2003 | Warner ............... | G06F 17/3061 |
| 6,873,982 B1 | 3/2005 | Bates et al. | |
| 6,883,708 B1 | 4/2005 | Fiedler et al. | |
| 7,287,005 B1 * | 10/2007 | Bruecken ............... | G06Q 20/10 |
| | | | 705/30 |

(Continued)

OTHER PUBLICATIONS

Banuna Mariana: "The Auditor's Responsibility to Take Into Account the Fraud and the Error Within a Financial Statement Audit," http://anale.steconomice.evonel.ro/arhiva/2007/finance-accounting-and-banks/12.pdf, pp. 1-4.

*Primary Examiner* — Daniel A Kuddus
(74) *Attorney, Agent, or Firm* — Fish & Richardson P.C.

(57) ABSTRACT

A system and methods for leveraging a community of users to collaboratively identify bank or investment account transaction descriptions by providing common, more recognizable description, category and location information used most often by the community. A database may be maintained that is accessible by the customer/user community to view, update and provide understandable descriptions for such cryptic descriptions. The database may be searchable such that a customer/user may search a description to determine or update the source of the transaction.

36 Claims, 6 Drawing Sheets

(56) References Cited

U.S. PATENT DOCUMENTS

| | | |
|---|---|---|
| 7,333,966 B2 * | 2/2008 | Dozier ................ G06F 16/9558 |
| | | 706/21 |
| 7,596,558 B2 | 9/2009 | Brewer et al. |
| 7,881,957 B1 | 2/2011 | Cohen et al. |
| 8,042,193 B1 | 10/2011 | Piliouras |
| 2001/0053991 A1 | 12/2001 | Bonabeau |
| 2002/0173986 A1 | 11/2002 | Lehew et al. |
| 2003/0004848 A1 | 1/2003 | Hellerstein et al. |
| 2003/0065756 A1 | 4/2003 | Carrez |
| 2003/0069844 A1 * | 4/2003 | Koren ................... G06Q 20/10 |
| | | 705/40 |
| 2003/0135825 A1 * | 7/2003 | Gertner ..................... G06F 8/38 |
| | | 715/230 |
| 2003/0135826 A1 * | 7/2003 | Dozier ................ G06F 16/9558 |
| | | 715/206 |
| 2003/0158806 A1 | 8/2003 | Hanley et al. |
| 2004/0078316 A1 * | 4/2004 | Clark ..................... G06Q 10/10 |
| | | 705/37 |
| 2004/0107125 A1 | 6/2004 | Guheen et al. |
| 2005/0154756 A1 | 7/2005 | Dettinger et al. |
| 2005/0201364 A1 | 9/2005 | Dalton et al. |
| 2006/0020611 A1 * | 1/2006 | Gilbert ................ G06F 21/6227 |
| 2006/0129452 A1 * | 6/2006 | Nordberg ............... G06Q 10/10 |
| | | 705/14.46 |
| 2006/0178892 A1 | 8/2006 | Oon |
| 2006/0282335 A1 | 12/2006 | Hanks et al. |
| 2007/0250872 A1 * | 10/2007 | Dua ....................... H04N 7/163 |
| | | 725/81 |
| 2008/0103912 A1 | 5/2008 | Naccache |
| 2008/0120129 A1 | 5/2008 | Seubert et al. |
| 2008/0127396 A1 | 6/2008 | Toyne |
| 2009/0070130 A1 | 3/2009 | Sundaresan et al. |
| 2009/0132395 A1 * | 5/2009 | Lam ...................... G06Q 30/02 |
| | | 705/30 |
| 2009/0157593 A1 | 6/2009 | Hayashi et al. |
| 2009/0234708 A1 | 9/2009 | Heiser et al. |
| 2009/0240605 A1 * | 9/2009 | Rukonic ............... G06Q 20/10 |
| | | 705/30 |

* cited by examiner

SYSTEMS AND METHODS FOR PRESENTING RECOGNIZABLE BANK ACCOUNT TRANSACTION DESCRIPTIONS COMPILED THROUGH CUSTOMER COLLABORATION

CLAIM OF PRIORITY

This application is a continuation of and claims priority under 35 USC 120 to U.S. Ser. No. 12/246,619, filed on Oct. 7, 2008, the entire contents of which is hereby incorporated by reference.

CROSS REFERENCES

The subject matter described in this application is related to subject matter disclosed in the following commonly assigned applications: U.S. patent application Ser. No. 12/246,608, filed on Oct. 7, 2008, now abandoned; and U.S. patent application Ser. No. 12/246,617, filed on Oct. 7, 2008, now abandoned, each entitled "Systems and Methods for Presenting Recognizable Bank Account Transaction Descriptions Compiled Through Customer Collaboration."

BACKGROUND

Customer service call centers receive a large number of calls related to unrecognized account transactions descriptions. In a recent survey, approximately 10% of calls were inquiries directed to clarifications of such descriptions. The cryptic credit, card, checking or savings account transaction descriptions may include those made as a result of automatic electronic withdrawals (ACH) and credit or debit card purchases.

A reason for the cryptic descriptions is that there are no transaction description standardization and compliance requirements within NACHA (The Electronic Payments Association) and Credit Card Association (MasterCard/Visa/American Express) processing rules. As such, the ACH processors, or credit and debit card merchants are free to choose any description deemed acceptable and often choose abbreviations and codes meaningful to them instead of the customer. In addition, since these are free-form text fields passing through multiple networks and processing systems, a systematic attempt to translate unrecognizable descriptions to more customer recognizable terminology would be very complex, problematic and costly to operate.

SUMMARY

A collective knowledge of a customer/user community may be leveraged to identify cryptic bank or investment account transaction descriptions through a mechanism by which the community may provide common, more recognizable description, category and location information. A database of recognizable descriptions may be maintained that is accessible by the customer/user community to view, update and provide understandable descriptions for such cryptic descriptions.

The database may be searchable such that a customer/user may search a particular transaction description to determine or update the source of the transaction with the recognizable description. The source may be submitted by other customers who saw the particular transaction description in an online transaction register. The customer/user may be able determine how other credit card customers have described this transaction description, classified this charge, identified the merchant/originator of the charge, or provided location information such as merchant address with ability to feed common Internet mapping.

The foregoing is a summary and thus contains, by necessity, simplifications, generalizations, and omissions of detail. Those skilled in the art will appreciate that the summary is illustrative only and is not intended to be in any way limiting.

BRIEF DESCRIPTION OF THE DRAWINGS

The foregoing summary, as well as the following detailed description of preferred implementations, is better understood when read in conjunction with the appended drawings. For the purposes of illustration, there is shown in the drawings exemplary implementations; however, the present disclosure is not limited to the specific methods and instrumentalities disclosed. In the drawings.

DETAILED DESCRIPTION

In accordance with implementations disclosed herein, the collective knowledge of a customer/user community may be leveraged to identify cryptic bank or investment account transaction descriptions through a mechanism by which the community may provide common, more recognizable description, category and location information. A database of recognizable descriptions may be maintained that is accessible by the customer/user community to view, update and provide understandable descriptions for such cryptic descriptions. The database may be searchable such that a customer/user may search a particular transaction description to determine or update the source of the transaction with the recognizable description.

For example, the transaction description "CIC*TRIPLE ADVANTAGE" may be searched to determine that this is a charge associated with FreeCreditReport.com credit record monitoring services. The customer/user may also update the database to reflect this information. As will be described below, credit card customers who saw this transaction description in an online transaction register may be able determine how other credit card customers have described this transaction description (i.e., they annotated the transaction to indicate that this is for credit protection), classified this charge (i.e., credit monitoring expense), identified the merchant/originator of the charge (i.e., FreeCreditReport.com), or provided location information such as merchant address with ability to feed common Internet mapping (i.e., "click here to see map of merchant location").

Figure 1:
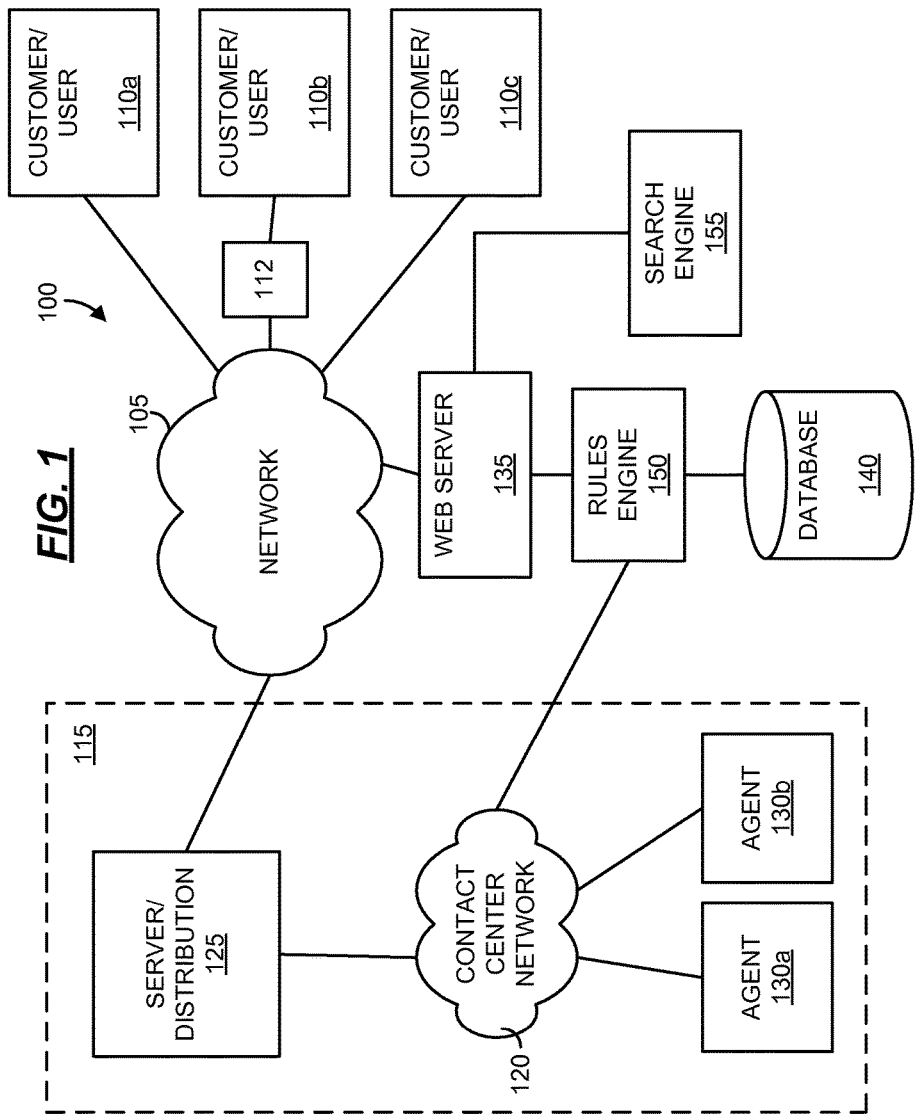
FIG. 1 illustrates an environment to collaboratively provide recognizable descriptions for transaction descriptions in a bank or investment account web page register.

FIG. 1 illustrates an environment 100 to collaboratively provide recognizable descriptions for transaction descriptions in a register. As shown, the environment 100 includes a network 105 (e.g., the public switched telephone network (PSTN), a WAN, Internet, etc.), connecting a plurality of customers/users 110a-110c to a customer center 115 (e.g., a customer center). The customer center 115 may include an internal voice/data network 120, which can be attached to a server 125, and a group of agent workstations 130a, 130b. Networking between the elements shown in FIG. 1 may use various TCP/IP protocols, although it should be understood that other network protocols can be used.

The customer center server 125 can be configured to receive and route interactions received through the network 105 from customers/users 110 to any of a number of agent workstations 130 via the internal customer center network 120. The customer center server 125 can perform the functions of an automatic call distribution system.

Moreover, the customer center server 125 can also provide the agent workstations 130a-b with script data, for example, retrieved from a script data database. Where the customer center is an assistance center for services, such as financial products and services, the script may be a manual of products and series that provides the agent specific information to use to respond to questions regarding offered products and services. It should be noted, however, that the script could be implemented in many different ways, such as, for example, a web page. In other implementations, the script can be stored on the agent workstation.

A web server 135 may be provided by a financial services provider or other third party to access account information, make online transactions, update personal information, perform bill payment, etc. The web server 135 includes, but is not limited to, one or more software, hardware, or firmware modules that can be configured to, for example, receive HTML requests from the customer/user 110a-110c using a device 112, that may be a personal computer, mobile computing device, notebook computer, wireless handset, PDA, etc. The web server 135 transmits HTML code that can render one or more web pages of information on the customer/user device 112. Code operable to display and receive information regarding transaction descriptions may be programmed within the one or more web pages that can be transmitted to the customer/user device 112.

A database 140 may be provided to store information regarding transaction descriptions and their recognizable descriptions. The database 140 may include tables linked by a primary key that correlate transaction descriptions to the recognizable descriptions provided by the customer/users 110a-110c or by agents 130a, 130b. The database 140 may be provided as a database management system, an object-oriented database management system, a relational database management system (e.g. Oracle, Access, etc.), a file system or another conventional database package. Further, the databases can be accessed via a Structure Query Language (SQL) or other tools known to one of ordinary skill in the art.

A rules engine 150 may analyze inputs (e.g., candidate recognizable descriptions) received from customers/users 110a-110c and/or agents 130a-130b. Rules may be applied against the inputs to determine if an input is a likely recognizable description for a transaction. For example, for the transaction description "CIC*TRIPLE ADVANTAGE," if an input received from a customer/user indicated this transaction is for "hot dogs," then the rules engine 150 may determine that this input is not correct (and not enter it into the database 140) if a relevant number of inputs indicated that this transaction is for "FreeCreditReport.com" or for "credit monitoring services." The rules engine 150 may apply a temporal window to the inputs as the transaction descriptions to change over time. Thus, if a number of different recognizable descriptions are received by the rules engine 150 over a predetermined temporal window, the rules engine 150 may determine that the transaction description has changed for a particular merchant and/or provider of services.

A search engine 155 may retrieve the recognizable descriptions provided by the customer/users 110a-110c or by agents 130a-130b that are stored in the database 140 to provide a ranking of such recognizable descriptions. For example, the ranking of a particular recognizable description may be based on a percentage of the total number recognizable descriptions that the particular transaction is received from the customer/users or agents. In some implementations, the ranking may be based on a weighting factor assigned to a source of the particular recognizable description. In some implementations, the ranking may be based on an amount of time that the particular from the description has been in the database 140. Other variations of weighting factors may be implemented to arrive at a statistically relevant result set.

In some implementations, the environment 100 may be used to collaboratively improve the transaction descriptions by aggregating unique recognizable descriptions received from customers/users 110a-110c and/or agents 130a-130b in the database 140 in accordance with the rules engine 150. The aggregation of the unique recognizable descriptions may be used by the search engine 155 to provide results as list of the unique recognizable descriptions in response to user queries. The listing of results may serve to a customer/user with an appropriate recognizable description for a transaction with a high degree of certainty that the recognizable description accurately reflects the merchant and/or provider of services associated with the transaction description.

Figure 2:
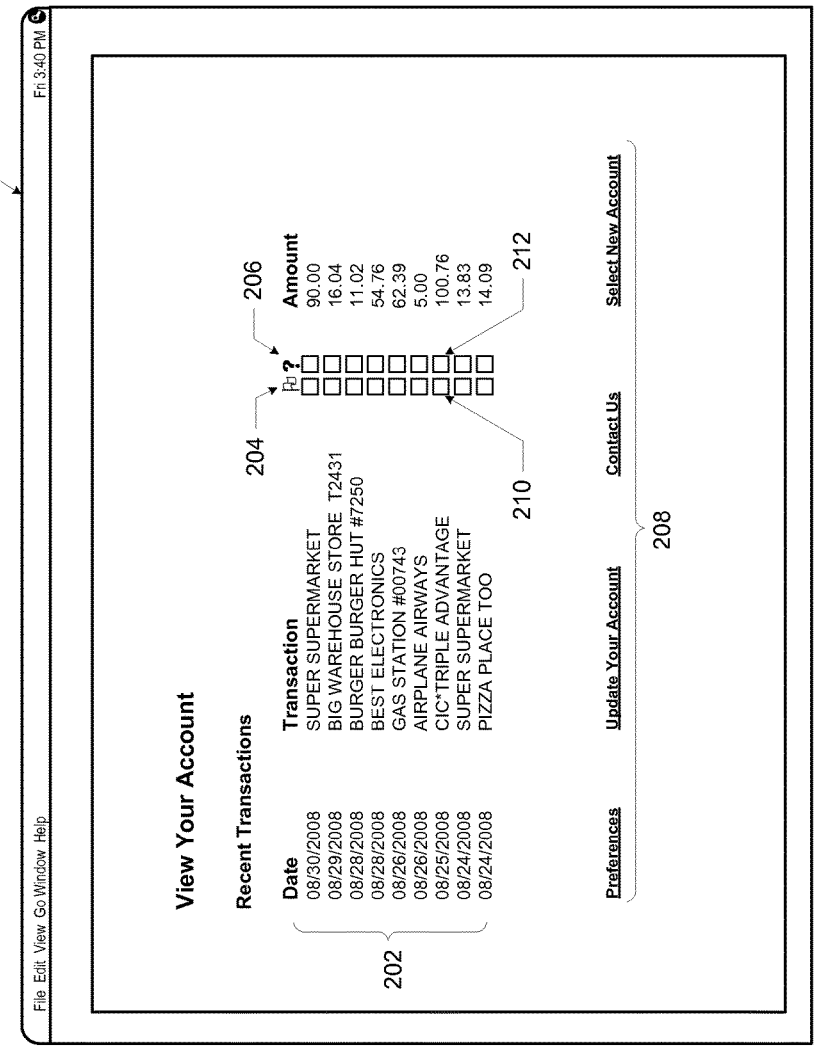
FIG. 2 is an example user interface for viewing transaction data associated with a credit card account or debit card linked to a checking account.

FIG. 2 is an example user interface 200 for viewing transaction data associated with a credit or debit card account. In the example user interface 200, a customer/user may have previously selected to view recent transactions associated with a particular credit or debit card account. As shown in the user interface 200, transactions 202 may be listed in date order identifying a date of the transaction, a transaction description, and an amount. Checkboxes 204 and 206 may be provided for the customer/user to provide a recognizable description for a particular transaction (by selecting check box 204 associated with the particular transaction) or to query or search for the recognizable description of a particular transaction (by selecting check box 206 associate with a particular transaction). Options 208 may be provided for the customer/user to indicate preferences, update his/her account, contact a financial services provider with whom the customer/user has the account, or to select a new account.

It is noted that the transactions 202 may be provided for previous statement periods and may be sorted based on different criteria other than a date. Also, the options 208 are provided for exemplary purposes and may include fewer, more, or different options that may be selected by the customer/user.

Figure 3:
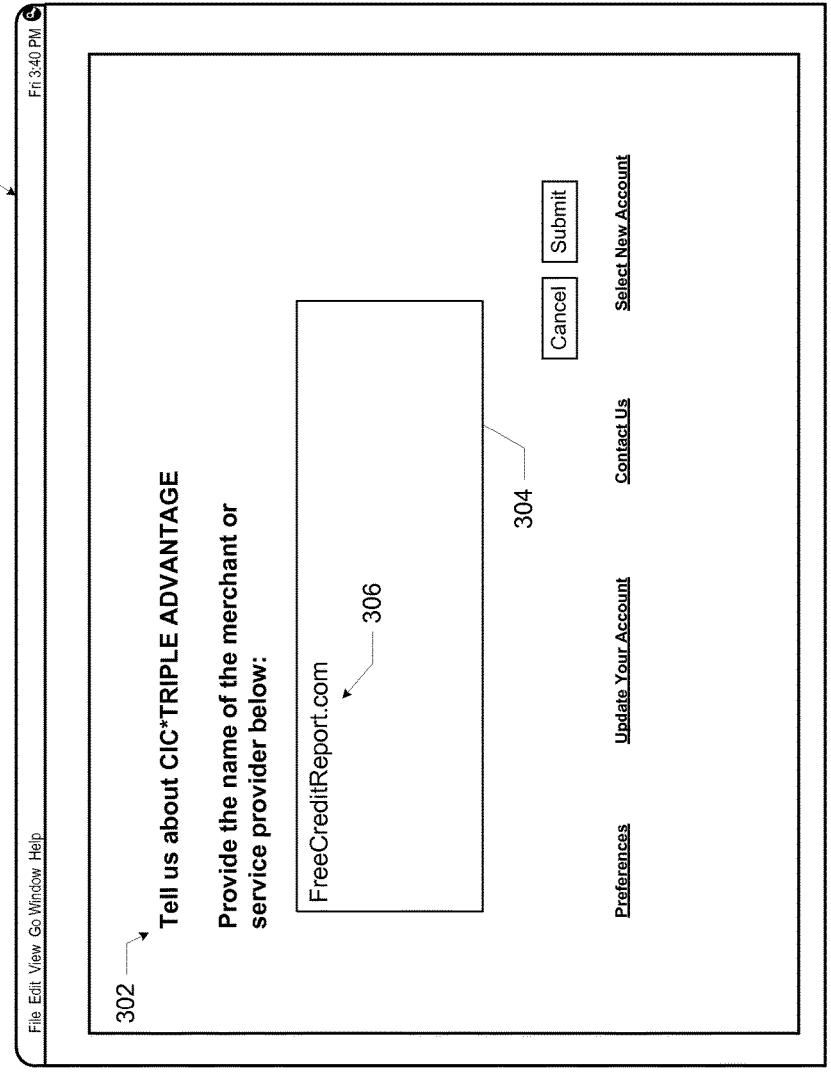
FIG. 3 illustrates the example user interface, which may be used to enter information about a transaction description.

Within the user interface 200, the customer/user may wish to provide a recognizable description for a transaction identified by CIC*TRIPLE ADVANTAGE by selecting the check box 210 associated with that transaction. Selecting the check box 210 may launch an example user interface 300 as shown in FIG. 3. FIG. 3 illustrates the example user interface 300, which may be used to enter information about a transaction description. A heading area 302 may be provided as a visual confirmation to the customer/user to confirm which transaction the user is providing a recognizable description. This as shown in the user interface 300, the heading area 302 indicates the customer/user should provide information (e.g., a name of the merchant or service provider) associated with "CIC*TRIPLE ADVANTAGE" into a text box 304. As shown text 306 may be entered by the customer/user to indicate that CIC*TRIPLE ADVANTAGE is actually FreeCreditReport.com. User may then click the "Submit" button to provide this information. The information may be stored in the database 140 upon submission to be aggregated with other submissions with respect to this particular transaction. If the user chooses not to provide information, or desires to exit the user interface 300, the user may click the "Cancel" button.

Figure 4:
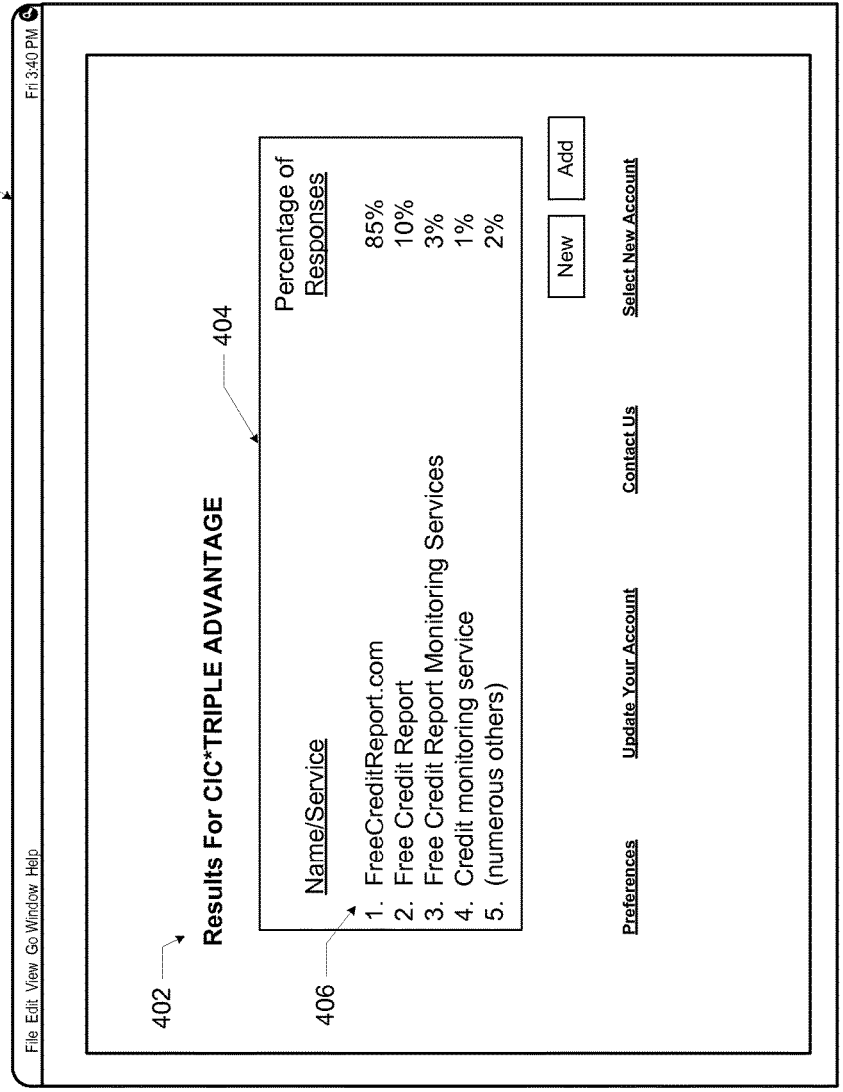
FIG. 4 illustrates the example user interface, which may be used to view or search for information about a transaction description.

Referred again to FIG. 2, within the user interface 200, the customer/user may wish to search for a recognizable description for a transaction identified by CIC*TRIPLE ADVANTAGE by selecting the check box 212 associated with that transaction. Selecting check box 212 may launch an example user interface 400 as shown in FIG. 4. FIG. 4 illustrates the example user interface 400, which may be used to view or search for information about a transaction description. A heading area 402 is provided as a visual reminder or confirmation to the customer/user of the transaction for which the user has requested a search for a recognizable description. Within a display area 404, a listing 406 may be provided of the most likely results of a recognizable description for the transaction identified by CIC*TRIPLE ADVANTAGE. This listing 406 may be ranked based a percentage of the total number of responses for the particular recognizable description.

For example, "FreeCreditReport.com" may have received 85% of all responses for the transaction identified by CIC*TRIPLE ADVANTAGE, "Free Credit Report" may have receive 10% of all responses, "Free Credit Report Monitoring Services" may have received 3%, "Credit monitoring service" may have received 1%, and numerous others (not listed) may have received a total of 2%. From this listing, the customer/user may make a deduction as to the merchant and or service provider associated with CIC*TRIPLE ADVANTAGE. In this instance, because of the high number of responses indicating that the merchant is FreeCreditReport.com, the customer/user may very likely conclude that FreeCreditReport.com is the merchant associated with CIC*TRIPLE ADVANTAGE.

The customer/user may search for a new transaction by clicking the "New" button, or may add a new recognizable description for the transaction by clicking the "Add" button.

Referring again to FIG. 2, in some implementations, the transaction descriptions may be pre-filled with recognizable descriptions based on a confidence level that the recognizable description for a particular transaction is correct. In such implementations, the transactions description CIC*TRIPLE ADVANTAGE may be pre-filled with FreeCreditReport.com such that when the customer/user 110a-110c is viewing the user interface 200, the customer/user 110a-110c would see FreeCreditReport.com in the list of transactions 202. Such implementations save the customer/user 110a-110c time, as they need not query the search engine 155 to determine the source of the transaction. The confidence level may be determined based on recognizable description having a percentage of responses in the database 150 larger than a predetermined number (e.g., 80%). The customer/user 110a-110c may override the pre-filled recognizable description by selecting, e.g., check box 210.

Figure 5:
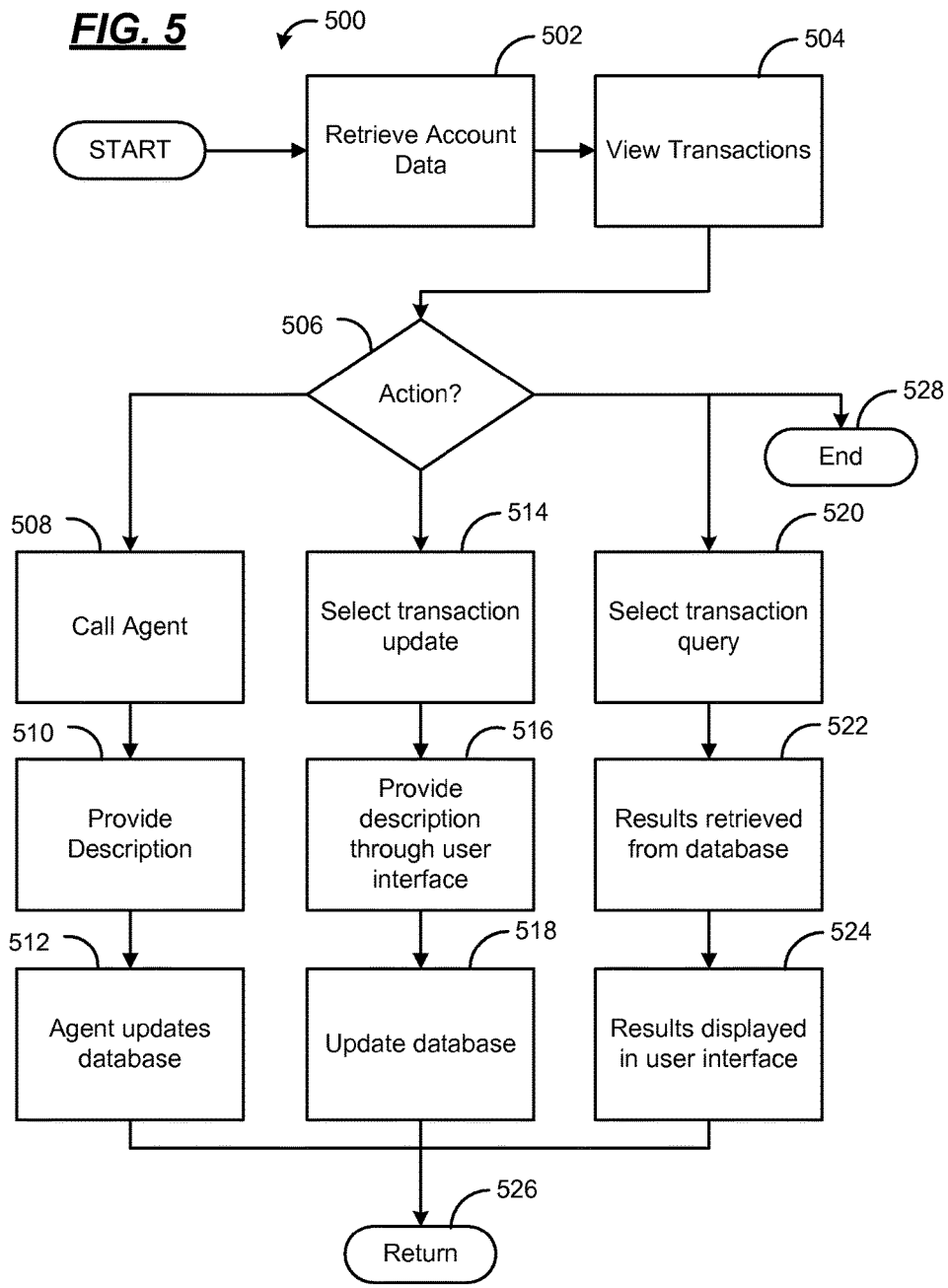
FIG. 5 is a flowchart illustrating an operational flow associated with providing or searching for recognizable descriptions of transactions.

FIG. 5 is a flowchart illustrating an operational flow 500 associated with providing or searching for recognizable descriptions of transactions. The process begins at 502, where account data is retrieved. The account data may be retrieved in response to a customer/user logging onto a website operated by a financial services provider or third party using the device 112 and contacting the web server 135. The customer account information may be retrieved from the financial services provider's account database (not shown).

At 504, transactions are displayed. In response to retrieving the customer/user account data, the web server 135 and communicate HTML or XML (or other markup language) data to a browser application running on the device 112 to display transaction information. Transaction information may be displayed in a user interface such as user interface 200.

At 506, it is determined if an action is received. When viewing transactions in the user interface 200, the customer/user may have a question and wishes to call to an agent (508), may indicate that he/she would like to update a transaction with a recognizable description (514), search for the recognizable description of a transaction (520), or end the session (528). If the user has a question and decides to call an agent about a transaction at 508, the customer/user may provide a description or ask questions about the transaction at 510. The interaction between the customer/user and the agent may result in a determination of the source of a particular transaction description. If so, then at 512, the agent may update the database. The agent through the contact center network 120, may update the database 140 (through the rules engine 150) with the source of the particular transaction as a recognizable description for that transaction description. At 526, the process returns to 506 to await further action.

If at 506, the customer/user selects a transaction update, the process continues at 514. The transaction update selection may be received through indication by the user in interface 200, such as selecting the check box 210. At 516, a description is provided by the customer/user. The selection of the check box 210 in the user interface 200 may cause the web server 135 to communicate a web page to the device 112 to render the user interface 300 wherein the customer/user may enter the name of the merchant or the service provider as the recognizable description for the selected transaction description. The customer/user may submit the input to the rules engine 154 population into the database 140. At 518, the database is updated. If the input passes the rules engine 150, the database 140 is updated with the input provided by the customer/user. At 526, the process returns to 506 to await further input.

If at 506, the customer/user selects a transaction query, the process continues at 520. The transaction query operation may be initiated in response to the customer/user selecting check box 212 in the user interface 200. The transaction description is then submitted to the search engine 155. At 522, results are retrieved from the database by the search engine. As noted above, the recognizable descriptions associated with the transaction description may be ranked by the search engine 155. At 524, the results of the search are displayed in a user interface. After the search engine has ranked the results the user interface 400 may be displayed on the device 112, showing likely recognizable descriptions for the transaction description ranked in order of relevance.

Optionally or alternatively, the customer/user may run a new search or add a new recognizable description for the transaction description. At 526, process returns to 506 to await further customer/user action.

If at 506 the customer/user wishes to end the session, then the process ends at 528. The customer/user may end the session by closing a browser in which the user interface is displayed or by logging out in accordance with a logout procedure set by the website 135.

In addition to the above, in some implementations, a social networking component may be part of the process 500. For example, at 504, a link may be added to displayed transactions to receive feedback about a particular merchant and/or service provider or to display feedback results regarding the particular merchant and/or service provider. In some implementations, the customer/user may be provided an option to rate merchant and/or service providers associated with a particular transaction. Such ratings may be used by other customers/users as part of their research about merchants and/or service providers reliability, customer service, etc.

In some implementations, advertising may be presented based on the transactions displayed. For example, if the customer/user has transactions with grocery stores, then coupons or advertising for grocery stores may be presented. This may lead to target marketing campaigns directly at customers/users making certain types of transactions.

Figure 6:
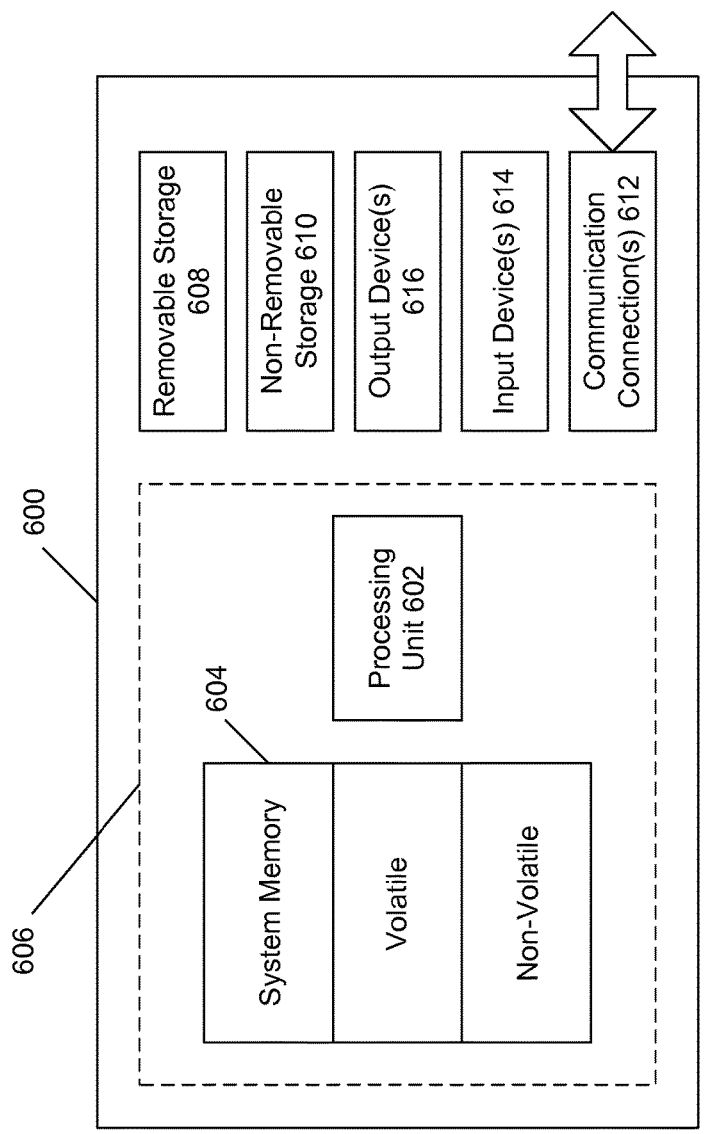
FIG. 6 shows an exemplary computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method comprising:
receiving, by at least one processor, one or more candidate recognizable descriptions of a particular financial transaction having a transaction description, the one or more candidate recognizable descriptions being different from the transaction description and being provided by a first user device;
retrieving, from a database, one or more other recognizable descriptions associated with the particular financial transactions, the one or more other recognizable descriptions being provided by a second user device that is different from the first user device and having been previously determined to be one or more alternative descriptions of the particular financial transaction;
using a rules engine to determine, at least partially based on the one or more other recognizable descriptions provided by the second user device, whether each of the one or more candidate recognizable descriptions provided by the first user device is an alternative description of the particular financial transaction;
determining a confidence level for each candidate recognizable description determined to be an alternative description of the particular financial transaction, each confidence level indicating a likelihood that a corresponding candidate recognizable description is a correct description of the particular financial transaction;
ranking each candidate recognizable description determined to be an alternative description of the particular financial transaction based on respective confidence levels;
storing, in a database, one or more data records representing only those of the one or more candidate recognizable descriptions determined to be one or more alternative descriptions of the particular financial transaction;
aggregating the one or more candidate recognizable descriptions provided by the first user device and determined to be an alternative description with the one or more other recognizable descriptions provided by the second user device and associated with the same transaction description; and
providing, by the at least one processor, a first user interface that comprises transaction data for the particular financial transaction, the first user interface displaying a list comprising at least a portion of the aggregated one or more candidate recognizable descriptions.

2. The method of claim 1, further comprising:
receiving a query for a description of the particular financial transaction; and
presenting, in response to the query, the list of at least a portion of the aggregated descriptions within a second user interface.

3. The method of claim 2, wherein the recognizable descriptions within the list are ranked.

4. The method of claim 3, wherein the ranking is based on a number of times each recognizable description within the list has been determined to be an alternative description of the particular financial transaction with respect to a total number of recognizable descriptions determined to be alternative descriptions of the particular financial transaction.

5. The method of claim 3, wherein the ranking is based on an amount of time that each recognizable description determined to be an alternative description of the particular financial transaction has been stored in the database.

6. The method of claim 3, wherein the ranking is based on a source associated with each recognizable description determined to be an alternative description of the particular financial transaction.

7. The method of claim 1, further comprising:
receiving, by the at least one processor, a request to provide a candidate recognizable description of the particular financial transaction; and
presenting, in response to the request, a second user interface within which a user can enter a candidate recognizable description for the particular financial transaction.

8. The method of claim 1, wherein at least one of the recognizable descriptions determined to be an alternative description of the particular financial transaction comprises a description of a merchant associated with the particular financial transaction.

9. The method of claim 1, wherein at least one of the recognizable descriptions determined to be an alternative description of the particular financial transaction comprises a description of a product or service associated the particular financial transaction.

10. The method of claim 1, wherein at least one of the recognizable descriptions determined to be an alternative description of the particular financial transaction comprises a description of an address associated the particular financial transaction.

11. The method of claim 1, wherein determining that the one or more candidate recognizable descriptions are alternative descriptions of the particular financial transaction comprises:
applying one or more rules to the one or more candidate recognizable descriptions to determine whether the one or more candidate recognizable descriptions are alternative descriptions of the particular financial transaction.

12. The method of claim 11, wherein the one or more rules vary according to the plurality of different recognizable descriptions received within a temporal window.

13. A system comprising:
at least one processor; and
a computer-readable medium storing instructions executable by the at least one processor to perform operations comprising:
receiving from, a first user device, one or more candidate recognizable descriptions of a particular financial transaction having a transaction description, the one or more candidate descriptions being different from the transaction description and being received by a first user device;
retrieving, from a database, one or more other recognizable descriptions associated with the particular financial transaction, the one or more other recognizable descriptions being provided by a second user device that is different from the first user device and having been previously determined to be one or more alternative descriptions of the particular financial transaction;
using a rules engine to determine, at least partially based on the one or more other recognizable descriptions provided by the second user device, whether each of the one or more candidate recognizable descriptions received from the first user device is an alternative description of the particular financial transaction;
storing, in a database, one or more data records representing only those of the one or more candidate recognizable descriptions determined to be one or more alternative descriptions of the particular financial transaction;
determining a confidence level for each candidate recognizable description determined to be an alternative description of the particular financial transaction, each confidence level indicating a likelihood that a corresponding candidate recognizable description is a correct description of the particular financial transaction;
ranking each candidate recognizable description determined to be an alternative description of the particular financial transaction based on respective confidence levels;
aggregating the one or more candidate recognizable descriptions provided by the first user device and determined to be an alternative description with the one or more other recognizable descriptions provided by the second user device and associated with the particular transaction; and
providing, by the at least one processor, a first user interface that comprises transaction data for the particular financial transaction, the first user interface displaying a list comprising at least a portion of the one or more aggregated descriptions.

14. The system of claim 13, the operations further comprising:

receiving a query for a description of the particular financial transaction; and
presenting, in response to the query, the list of at least a portion of the aggregated descriptions.

15. The system of claim 14, wherein the list of at least a portion of aggregated descriptions is ranked.

16. The system of claim 15, wherein the ranking is based on a number of times each recognizable description determined to be an alternative description of the particular financial transaction has been received with respect to a total number of recognizable descriptions determined to be alternative descriptions of the particular financial transaction have been received.

17. The system of claim 15, wherein the ranking is based on an amount of time that each recognizable description determined to be an alternative description of the particular financial transaction has been stored in the database.

18. The system of claim 15, wherein the ranking is based on a source associated with each recognizable description determined to be an alternative description of the particular financial transaction.

19. The system of claim 13, the operations further comprising:
receiving a request to provide a candidate recognizable description of the particular financial transaction; and
presenting, in response to the request, a second user interface within which a user can enter a candidate recognizable description for the particular financial transaction.

20. The system of claim 13, wherein at least one of the recognizable descriptions determined to be an alternative description of the particular financial transaction comprises a description of a merchant associated with the particular financial transaction.

21. The system of claim 13, wherein at least one of the recognizable descriptions determined to be an alternative description of the particular financial transaction comprises a description of a product or service associated the particular financial transaction.

22. The system of claim 13, wherein at least one of the recognizable descriptions determined to be an alternative description of the particular financial transaction comprises a description of an address associated the particular financial transaction.

23. The system of claim 13, wherein determining that the one or more candidate recognizable descriptions are alternative descriptions of the particular financial transaction comprises:
applying one or more rules to the one or more candidate recognizable descriptions to determine whether the one or more candidate recognizable descriptions are alternative descriptions for the particular financial transaction.

24. The system of claim 23, wherein the one or more rules vary according to the plurality of different recognizable descriptions received within a temporal window.

25. A non-transitory computer readable storage device storing computer executable instructions which, when executed by a computer, performs a process comprising:
receiving, by at least one processor, one or more candidate a recognizable descriptions of a particular financial transaction having a transaction description, the one or more candidate recognizable descriptions being different from the transaction description and being provided by a first user device;
retrieving, from a database, one or more recognizable descriptions associated with the particular financial transaction, the one or more other recognizable descriptions being provided by a second user device that is different from the first user device and having been previously determined to be one or more alternative descriptions of the particular financial transaction;

using a rules engine to determine, at least partially based on the one or more other recognizable descriptions provided by the second user device, whether each of the one or more candidate recognizable descriptions provided by the first user device is an alternative description of the particular financial transaction;

determining a confidence level for each candidate recognizable description determined to be an alternative description of the particular financial transaction, each confidence level indicating a likelihood that a corresponding candidate recognizable description is a correct description of the particular financial transaction;

ranking each candidate recognizable description determined to be an alternative description of the particular financial transaction based on respective confidence levels;

storing, in a database, one or more data records representing those of the one or more candidate recognizable descriptions determined to be one or more alternative descriptions of the particular financial transaction;

aggregating the one or more candidate recognizable descriptions provided by the first user device and determined to be an alternative description with the one or more other recognizable descriptions provided by the second user device and associated with the same transaction description; and providing, by the at least one processor, a first user interface that comprises transaction data for the particular financial transaction, the first user interface displaying a list comprising at least a portion of the one or more aggregated descriptions.

26. The storage device of claim 25, the process further comprising:

receiving a query for a description of the particular financial transaction; and presenting, in response to the query, the list of at least a portion of the aggregated descriptions within a second user interface.

27. The storage device of claim 26, wherein the list is ranked.

28. The storage device of claim 27, wherein the ranking is based on a number of times each recognizable description within the list has been determined to be an alternative description of the particular financial transaction with respect to a total number of recognizable descriptions determined to be alternative descriptions of the particular financial transaction.

29. The storage device of claim 27, wherein the ranking is based on an amount of time that each recognizable description determined to be an alternative description of the particular financial transaction has been stored in the database.

30. The storage device of claim 27, wherein the ranking is based on a source associated with each recognizable description determined to be an alternative description of the particular financial transaction.

31. The storage device of claim 25, the process further comprising:

receiving, by the at least one processor, a request to provide a candidate recognizable description of the particular financial transaction; and presenting, in response to the request, a second user interface within which a user can enter a candidate recognizable description for the particular financial transaction.

32. The storage device of claim 25, wherein at least one of the recognizable descriptions determined to be an alternative description of the particular financial transaction comprises a description of a merchant associated with the particular financial transaction.

33. The storage device of claim 25, wherein at least one of the recognizable descriptions determined to be an alternative description of the particular financial transaction comprises a description of a product or service associated the particular financial transaction.

34. The storage device of claim 25, wherein at least one of the recognizable descriptions determined to be an alternative description of the particular financial transaction comprises a description of an address associated the particular financial transaction.

35. The storage device of claim 25, wherein determining that the one or more candidate recognizable descriptions are alternative descriptions of the particular financial transaction comprises:

applying one or more rules to the one or more candidate recognizable descriptions to determine whether the one or more candidate recognizable descriptions are alternative descriptions of the particular financial transaction.

36. The storage device of claim 35, wherein the one or more rules vary according to the plurality of different recognizable descriptions received within a temporal window.

* * * * *

UNITED STATES PATENT AND TRADEMARK OFFICE
CERTIFICATE OF CORRECTION

PATENT NO. : 10,346,835 B1  
APPLICATION NO. : 14/642895  
DATED : July 9, 2019  
INVENTOR(S) : Jeffrey Walton Easley Page 1 of 1

It is certified that error appears in the above-identified patent and that said Letters Patent is hereby corrected as shown below:

In the Claims

Column 10, Claim 9, Line 64, after "associated" insert -- with --, therefor.

Column 11, Claim 10, Line 2, after "associated" insert -- with --, therefor.

Column 12, Claim 21, Line 38, after "associated" insert -- with --, therefor.

Column 12, Claim 22, Line 43, after "associated" insert -- with --, therefor.

Column 12, Claim 25, Line 61, before "recognizable" delete "a".

Column 14, Claim 33, Line 29, after "associated" insert -- with --, therefor.

Column 14, Claim 34, Line 34, after "associated" insert -- with --, therefor.

Signed and Sealed this  
Fourth Day of February, 2020

Andrei Iancu  
*Director of the United States Patent and Trademark Office*